(12) United States Patent
Matsushita et al.

(10) Patent No.: US 7,245,437 B2
(45) Date of Patent: Jul. 17, 2007

(54) COLLIMATOR LENS FOR OPTICAL PICKUP

(75) Inventors: Hideyuki Matsushita, Tochigi (JP); Keiji Komiya, Tochigi (JP)

(73) Assignee: Fujinon Sano Corporation, Sano-shi (JP)

( * ) Notice: Subject to any disclaimer, the term of this patent is extended or adjusted under 35 U.S.C. 154(b) by 0 days.

(21) Appl. No.: 11/277,851

(22) Filed: Mar. 29, 2006

(65) Prior Publication Data

US 2006/0221454 A1   Oct. 5, 2006

(30) Foreign Application Priority Data

Apr. 1, 2005   (JP) ............... 2005-105722

(51) Int. Cl.
*G11B 7/00* (2006.01)
*G02B 27/30* (2006.01)

(52) U.S. Cl. .................. 359/641; 369/44.32

(58) Field of Classification Search ............ 359/641, 359/719, 716; 369/44.23, 44.32, 112.23, 369/112.24, 112.01

See application file for complete search history.

(56) References Cited

U.S. PATENT DOCUMENTS 5,491,587 A * 2/1996 Iwaki et al. ............... 359/641

\* cited by examiner

*Primary Examiner*—Alicia M Harrington
(74) *Attorney, Agent, or Firm*—Oblon, Spivak, McClelland, Maier & Neustadt, P.C.

(57) ABSTRACT

A collimator lens located in a light path from a laser light source to an optical information recording medium. The collimator lens is constituted by a cemented lens which is composed of a biconvex lens and a meniscus lens, and an aspheric plastic lens in the form of a transparent thin synthetic resin film which is laminated on a lens surface of the biconvex lens on the side of or facing toward an optical recording medium. When calculated on the basis of a composite focal length f=10 mm, the collimator lens has an epaxial chromatic aberration correction rate (a) and a numerical aperture NA in the ranges of (1) (a) <2.2 μm/nm and (2) 0.4>NA≧0.12, respectively.

10 Claims, 12 Drawing Sheets

COLLIMATOR LENS FOR OPTICAL PICKUP

BACKGROUND OF THE INVENTION

1. Field of the Art

This invention relates to a collimator lens for collimating light rays from a light source to produce a parallel light beam, particularly suitable for use in an optical pickup system for recording and reproducing information on optical discs or similar optical recording media.

2. Prior Art

Generally, optical pickups in use for recording and reproducing data on an optical disc or a similar recording medium are constituted by a laser light source in the form of a laser diode or the like, an objective lens for converging a laser light beam from the light source into a minute beam spot toward an optical disc surface, and a photo-detector for detecting reflected light coming from the optical disc. Further, since light rays from the light source are divergent light rays, the optical pickup is provided with a collimator lens to collimate the light rays, along with a beam splitter and a holographic optical element for splitting light paths of an output light beam of the light source and reflected signal light from an optical disc.

In this connection, in consideration of problems of follow-up actions in auto focusing, it is necessary for an optical system of the optical pickup to be able to suppress aberrations to a minimum. Especially, in a case where a laser diode of a short wavelength of approximately 400 nm is employed for the purpose of enhancing the density of information, it is necessary to correct to a sufficient degree not only spherical aberrations but also axial chromatic aberrations because the wavelength of the laser diode dependent on temperature to give rise to the problem of so-call wavelength leaping.

In this regard, described in Japanese Laid-Open Patent Application H5-127078 is an optical pickup with an optical system which is arranged to correct axial chromatic aberrations of an objective lens. In the case of this Japanese Laid-Open Patent Application H5-127078, an objective lens is constituted by a cemented lens which is composed of two spherical glass lenses, i.e., a biconvex lens and a meniscus lens. An aspheric plastic lens is laminated on one convex surface of the biconvex lens of the objective lens, which faces toward a recording disc surface.

However, in this case, the objective lens in the form of a cemented glass lens is required to be an extremely bright lens with an NA as large as 0.53, which however involves difficulties in lens designing and results in a very costly optical system. It is possible to correct aspheric aberrations by laminating a plastic film of an aspheric lens on a surface of the cemented glass lens, but this method of correcting spherical aberrations by making an objective lens surface aspheric requires an aspheric lens surface of a complicate shape with a greater degree of ups and downs. Generally, a plastic lens is laminated on a glass lens by the use of a stamping die, but this method is not always feasible because difficulties are usually encountered in forming thick aspheric lenses by stamping.

On the other hand, described in Japanese Laid-Open Patent Application H6-331888 is a collimator lens which is imparted with a function of correcting spherical aberrations, i.e., an aspheric collimator lens having an ellipsoid of revolution of a positive refraction power on a collimated light discharging side and a spherical surface on the opposite side. In this case, the collimator lens can correct spherical aberrations and sine condition satisfactorily in an NA range of 0.15 to 0.3.

As mentioned above, the prior art collimator lens is arranged to correct both spherical aberrations and sine condition to a satisfactory degree in a low NA range of NA=0.15 to 0.3. There arises no problem in particular, for example, at a wavelength of 660 nm, a wavelength for DVD (Digital Versatile Disc). However, in case an optical pickup employs as a light source a laser diode of a short wavelength, for example, a laser diode of 408 nm in a blue wavelength range, it becomes necessary to solve a new problem of axial aberrations from the standpoint of realizing higher densification of information.

The optical arrangements described in above-mentioned Japanese Laid-Open Patent Application H6-331888 is not for an optical pickup with a light source of a short wavelength because it is difficult to correct axial chromatic aberrations to a practically acceptable degree. Besides, although there is no description with regard to lens material in Japanese Laid-Open Patent Application H6-331888, fabrication of an aspheric glass lens is difficult and very costly.

DISCLOSURE OF THE INVENTION

Under the circumstances as discussed above, it is an object of the present invention to provide a collimator lens which is inexpensive and simple in construction and yet capable of effectively correcting aspheric and axial chromatic aberrations.

It is another object of the present invention to provide a collimator lens suitable for use in an optical system of an optical pickup, which collimator lens is capable of effectively correcting spherical aberrations and axial chromatic aberrations despite fluctuations of wavelength which take place under the influence of variations in environmental temperature.

It is still another object of the present invention to provide a collimator lens which is capable of correcting aberrations, particularly in an optical system employing the collimator lens for collimating light rays from a laser diode light source of approximately 400 nm in wavelength.

In accordance with the present invention, the above-stated objectives are achieved by the provision of a collimator lens for an optical pickup, the collimator lens being located in a light path from a laser light source to an optical information recording medium to collimate a laser beam from said laser light source, and comprising: a cemented glass lens formed by bonding together two glass lens elements, i.e., a biconvex lens and a meniscus lens; and an aspheric plastic lens in the form of a thin transparent synthetic resin film laminated on a surface of the biconvex lens located on the side of the optical information recording medium; when calculated on the basis of a composite focal length f=10 mm, said collimator lens having an axial aberration correction rate (a) and a numerical aperture NA as expressed by following formulas (1) and (2), $$(a)\ 2.2 \sim m/nm, \tag{1}$$

$$0.4 > NA \geqq 0.12. \tag{2}$$

An aspheric plastic lens is laminated at least on a lens surface of the biconvex lens. However, in addition to a lens surface of the biconvex lens, an aspheric plastic lens may be laminated on a lens surface of the meniscus lens if desired. Preferably, the aspheric plastic lens is formed of a polyester-base synthetic resin material. The collimator lens of the present invention is suitably applied to a laser light source which emits a laser beam of a wavelength approximately in the range of 395 nm to 415 nm.

The above and other objects, features and advantages of the present invention will become apparent from the following particular description of the invention, taken in conjunction with the accompanying drawings which show by way of example some preferred embodiments of the invention. Needless to say, the present invention should not be construed as being limited to particular forms shown in the drawings.

PREFERRED EMBODIMENTS

According to the present invention, spherical aberrations and axial chromatic aberrations of an optical system in an optical pickup are corrected by means of a collimator lens which collimates a laser beam from a light source. In a case where the light source emits a laser beam of a blue wavelength, namely, a laser beam of 408 nm, for example, wavelength fluctuations of approximately ±5 nm can occur as a result of changes in environmental temperature. As a collimator lens, the optical system employs a cemented glass lens which is composed of a biconvex lens and a meniscus lens and which is adapted to satisfy conditions (1) regarding correction of axial chromatic aberrations, correcting axial chromatic aberrations to a satisfactory degree within the range of wavelength fluctuations caused by temperature changes.

In construction, the collimator lens is constituted by a biconvex lens and a meniscus lens, both of glass, which are bonded together by the use of a transparent adhesive. Of the cemented glass lens, the biconvex lens is located on the side of an information recording medium. An aspheric plastic lens is laminated at least on a lens surface of the biconvex lens which faces toward the information recording medium, and, if necessary, also on a lens surface of the meniscus lens on the side of the laser light source thereby to correct spherical aberrations effectively. In this case, since the collimator lens plays the role of correcting spherical aberrations and axial chromatic aberrations, it becomes possible to use an inexpensive lens. However, in a case where NA is larger than 0.4, it becomes equivalent with the objective lens in cost. On the other hand, in a case where NA is smaller than 0.12, it is unable to provide sufficient power as a collimator lens of an optical pickup, particularly sufficient power for ensuring error-free writing actions on optical recording media.

In this instance, the collimator lens, which is in the form of a cemented lens composed of a biconvex lens and a meniscus lens and having an aspheric plastic lens laminated on a lens surface of the biconvex lens, is normally formed in a circular shape in outer configuration, but may be formed in an oval shape or in a square or more than quadrilateral polygonal shape or may be provided with a D-cut for the purposing of facilitating positioning and orientation of the collimator lens in an assembling stage.

Embodiment 1

Figure 1:
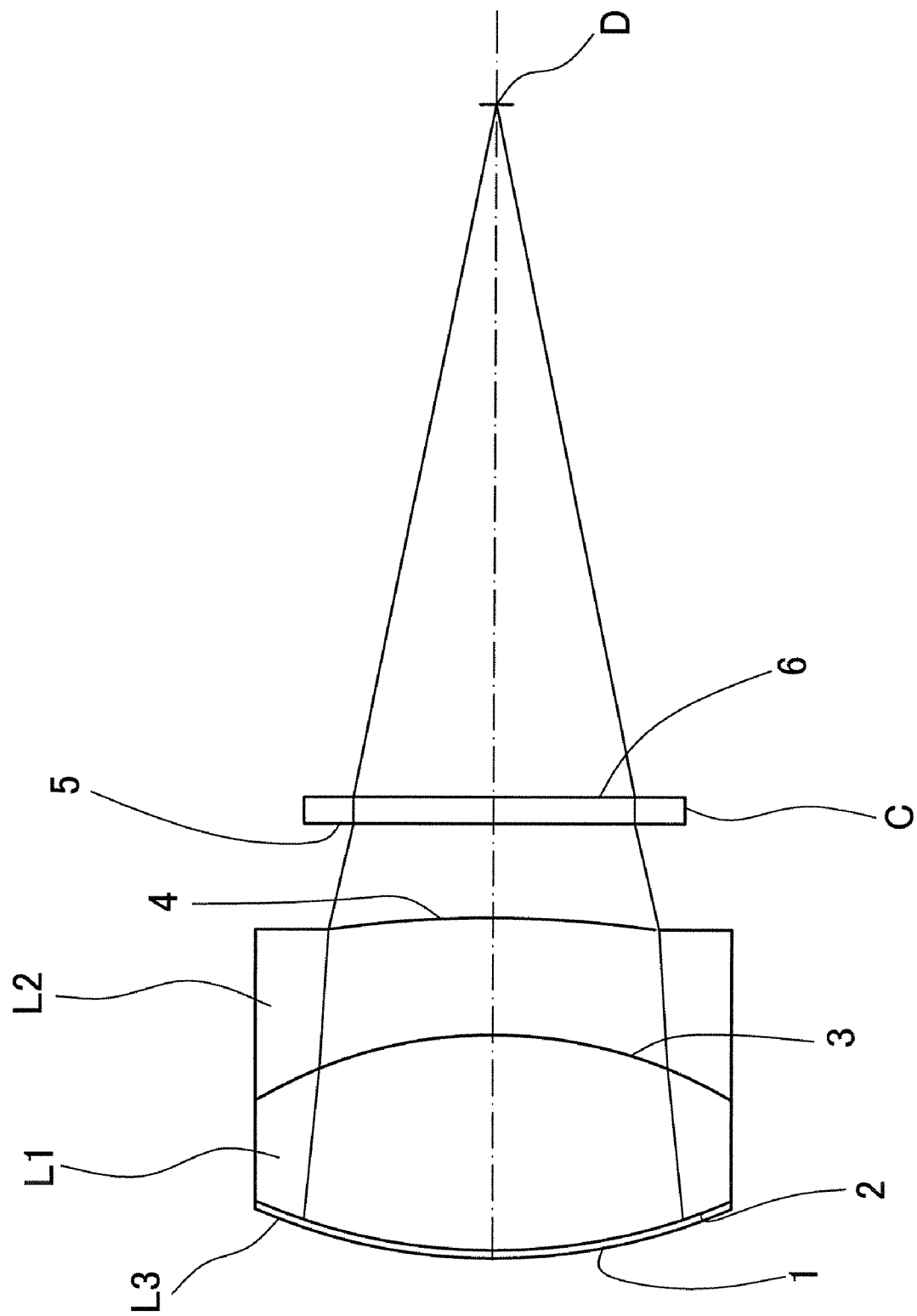
FIG. 1 is a schematic illustration of an optical system according to a first embodiment of the present invention.

Shown schematically in FIG. 1 is a collimator lens construction adopted as a first embodiment of the invention. In this figure, indicated at L1 is a biconvex lens, at L2 a meniscus lens and at L3 an aspheric plastic lens. Thus, the collimator lens is made up of three lens elements L1, L2 and L3. Indicated at D is a laser light source which emits a laser beam like a laser diode, and at C is a cover member of the laser light source D. The lens L2 of the collimator lens is located on the side of the laser light source D, and the aspheric plastic lens L3 is laminated on a lens surface of the biconvex lens L1, which is located on the side away from the laser light source D. This aspheric plastic lens L3 is formed, for example, by stamping molten transparent synthetic resin material on a lens surface of the biconvex lens L1, transferring a lens surface to the molten synthetic resin material by impressing a lens transfer surface of a stamping die on the synthetic resin material.

Here, a surface of the aspheric plastic lens L3 on the side of an information recording medium constitutes a first surface, a surface of the lens L1 joined with the aspheric plastic lens L3 constitutes a second surface, a joined surface of the first and second lenses L1 and L2 constitutes a third surface, and a surface of the second lens L2 on the side of the laser light source D constitutes a fourth surface. Further, a surface of the cover member C which is located on the side of the collimator lens constitutes a fifth surface, and a surface on the opposite side of the cover member C, that is, on the side of the light source constitutes a sixth surface. Shown in Table 1 below are radii of curvature, thicknesses at different positions and material of the respective surfaces. The output wavelength of the laser diode of the light source D was 408 nm (in center wavelength and the same applies hereafter). The collimator lens had a total focal length f of 10 mm, and an NA of 0.2. Chromatic aberrations correction rate (a) of the collimator lens was 0.08 μm/nm.

TABLE 1

|   | Curvature | Thickness | Material | Conic | Secondary | Quaternary | Sextic |
|---|---|---|---|---|---|---|---|
| 1 | 1.57E−01 | 4.00E−03 | A.F.(*1) | 7.99E−01 | 0.00E+00 | −6.21E−04 | −1.04E−05 |
| 2 | 1.57E−01 | 2.20E+00 | S-BSL7 | | | | |
| 3 | −2.01E−01 | 1.20E+00 | S-TIM27 | | | | |
| 4 | −7.52E−02 | 1.00E+00 | | | | | |
| 5 | 0.00E+00 | 2.50E−01 | S-BSL7 | | | | |
| 6 | 0.00E+00 | 7.23E+00 | | | | | |

(*1): Aspheric Film

Figure 2:
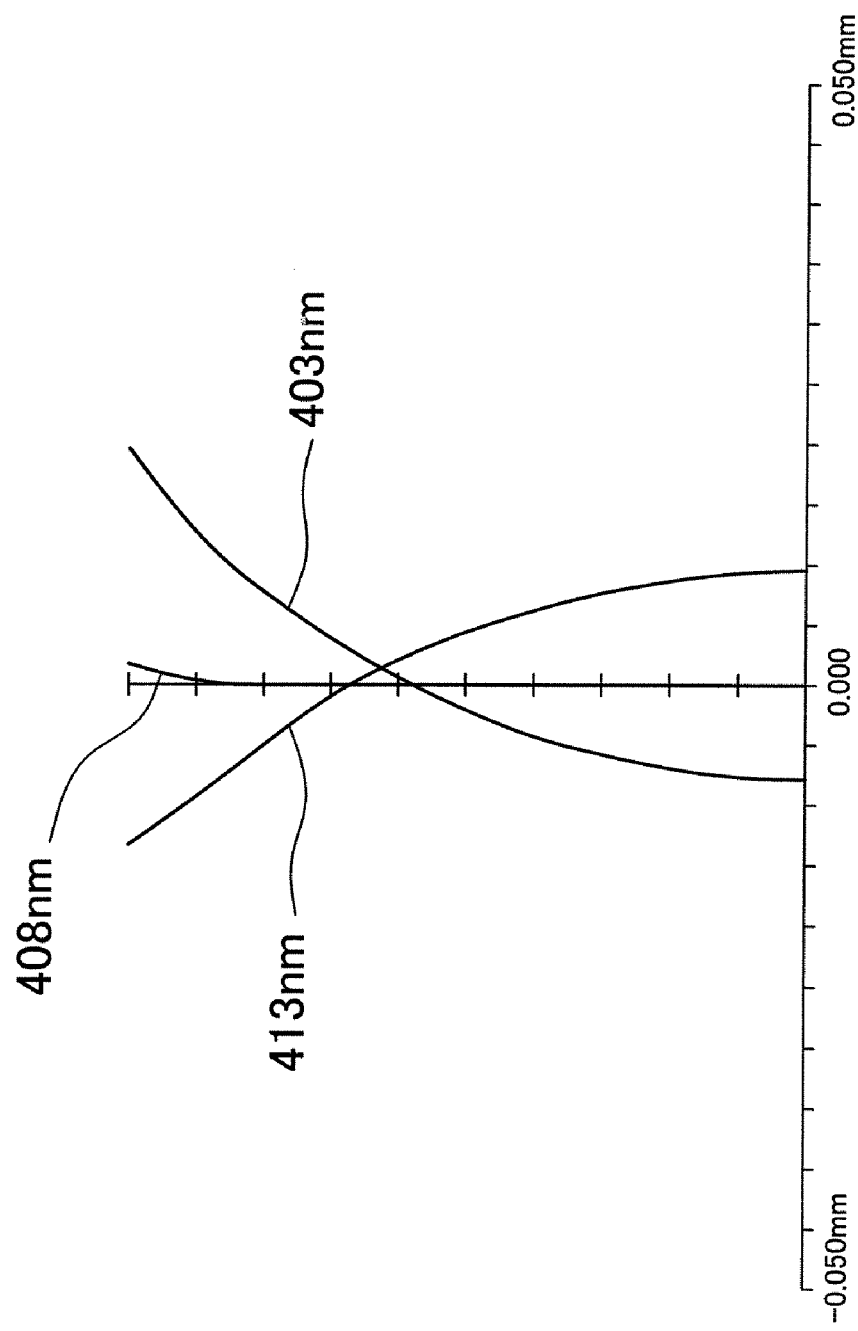
FIG. 2 is a graph of vertical aberrations of the optical system shown in FIG. 1.

Shown in FIG. 2 is a graph of vertical aberrations of an optical system using a collimator lens of the above construction. This graph shows aberrations when the wavelength of a laser beam from the light source D was at 408 nm, along with aberrations when the wavelength of a laser beam from the light source D was fluctuated to 403 nm and 413 nm, respectively, under the influence of changes in temperature.

Embodiment 2

Figure 3:
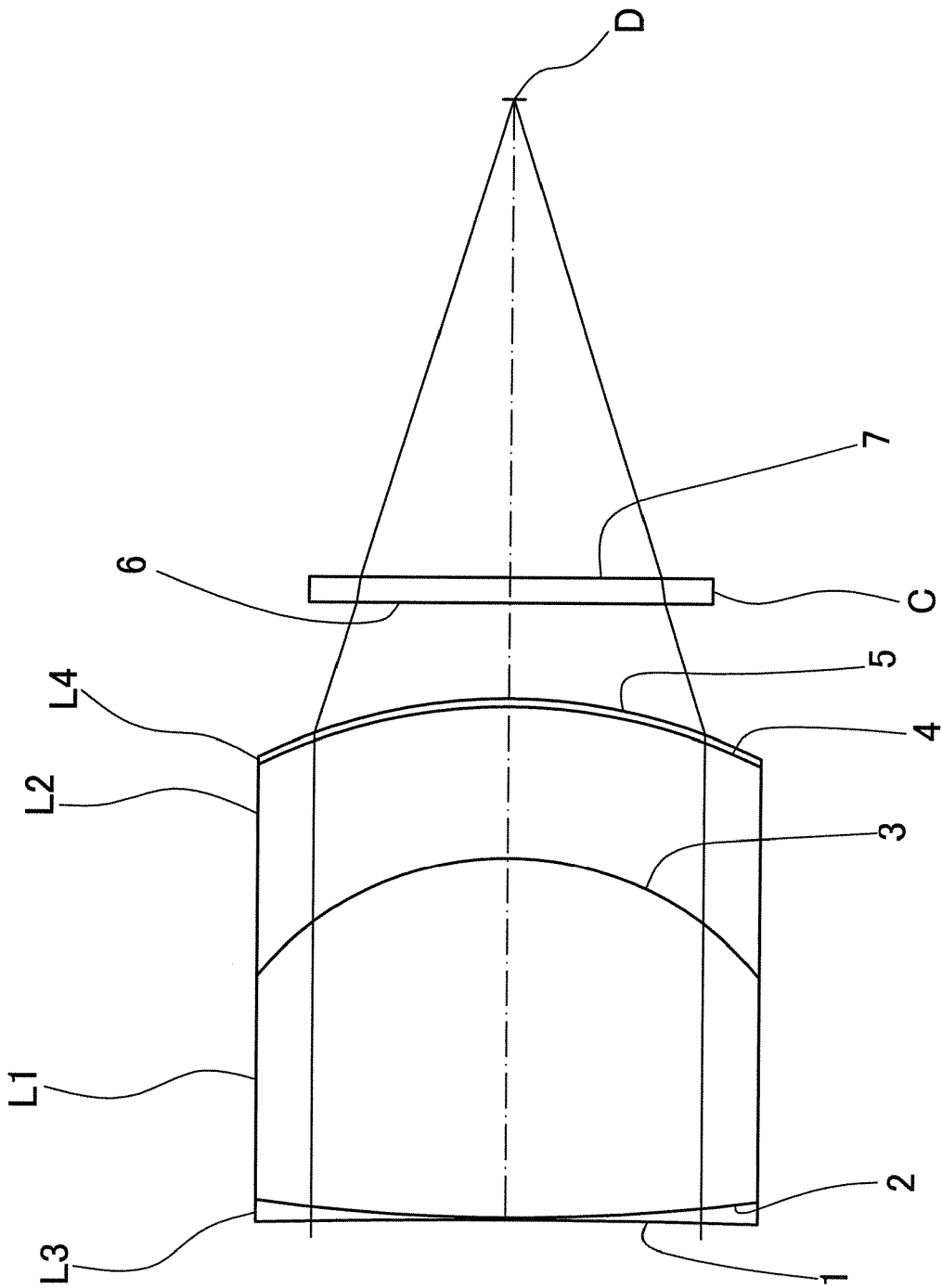
FIG. 3 is a schematic illustration of an optical system according to a second embodiment of the present invention.

Shown in FIG. 3 is a lens construction adopted as a second embodiment of this present invention. This second embodiment is same as the foregoing first embodiment in that an aspheric plastic lens L3 is laminated on a surface of the lens L1 on the side of an information recording medium, but differs from the first embodiment in that another aspheric plastic lens L4 is laminated on a surface of the lens L2 on the side of the light source D. In this case, a surface of the aspheric plastic lens L3 on the side of an information recording medium constitutes a first surface, a surface of the lens L1 joined with the aspheric plastic lens L3 constitutes a second surface, a joint surface of the lenses L1 and L2 constitutes a third surface, a surface of the lens L2 joined with the aspheric plastic lens L4 constitutes a fourth surface, and a surface of the aspheric plastic lens L4 on the side of the light source constitutes a fifth surface. Further, a surface of the cover glass C on the side of the collimator lens constitutes a sixth surface, and a surface of the cover glass C on the side of the light source constitutes a seventh surface. Shown in Table 2 below are radii of curvature, thicknesses at different positions and material of the respective surfaces. The output wavelength of the laser diode of the light source D was 408 nm. The collimator lens had a total focal length f=6.5 mm, and an NA of 0.2. Chromatic aberration correction rate (a) of the collimator lens was 0.03 μm/nm.

nm, along with aberrations when the wavelength of a laser beam from the light source D was fluctuated to 403 nm and 413 nm, respectively, under the influence of temperature variations.

Embodiment 3

Figure 5:
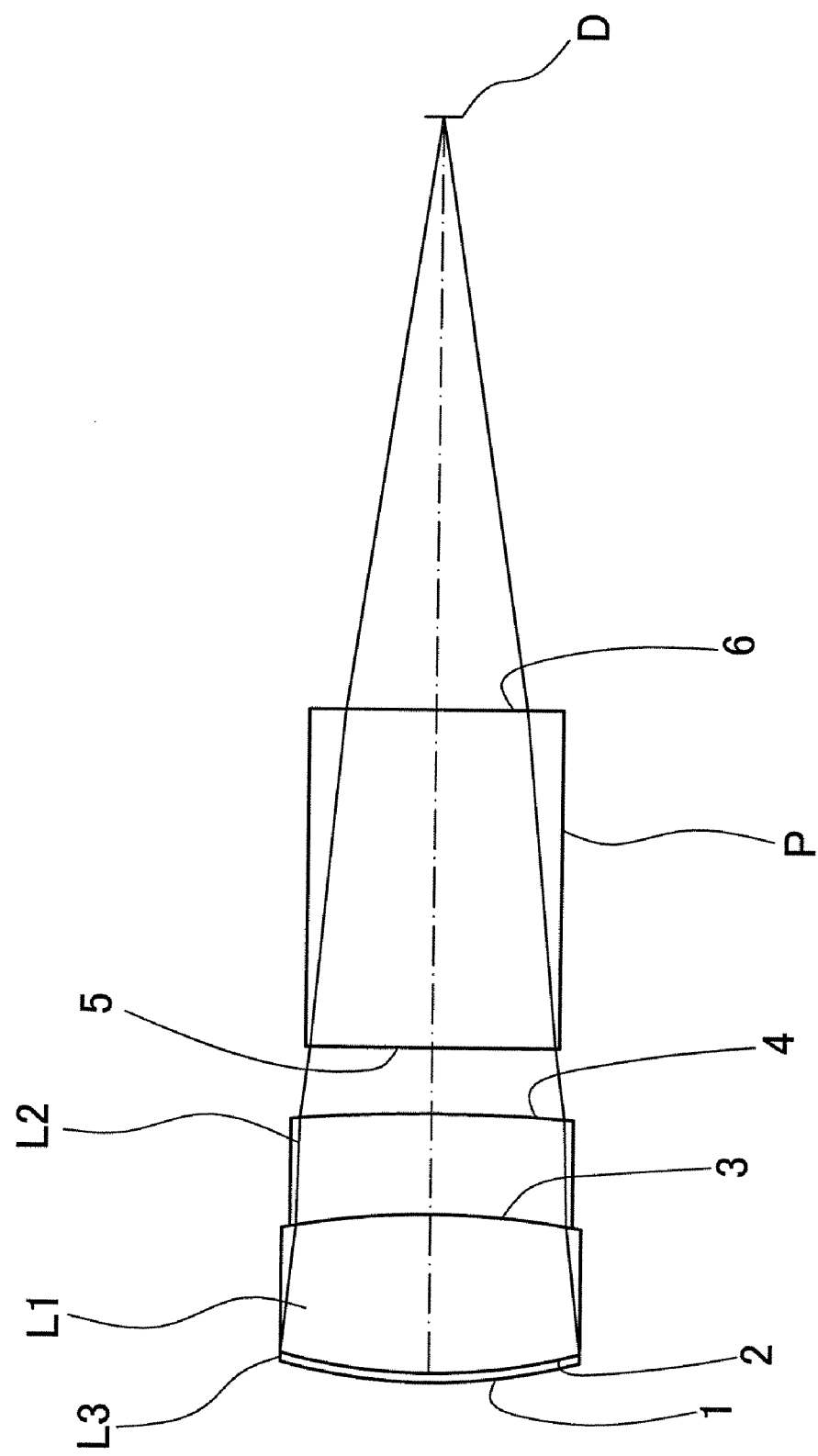
FIG. 5 is a schematic illustration of an optical system according to a third embodiment of the present invention.

Further, shown in FIG. 5 is an optical system employing a collimator lens which is so located as to collimate laser beams from two different light sources, of which one is adapted to output a laser beam of 408 nm wavelength while the other one is adapted to output a laser beam of 660 nm wavelength. In order to collimate laser beams from two light sources, the optical system employs a prism P forward of a light source D which outputs a laser beam of 408 nm wavelength. A laser beam of 660 nm from another light source (not shown) is reflected toward a collimator lens by the prism P. In this case, the collimator lens is constituted by a cemented glass lens which is composed of a biconvex lens L1 and a meniscus lens L2, and an aspheric plastic lens L3 which is laminated on a lens surface of the biconvex lens L1 which is located on the side of an information recording medium.

In this case, a surface of the aspheric plastic lens facing toward an information recording medium constitutes a first surface, a surface of the lens L1 joined with the aspheric plastic lens L3 constitutes a second surface, a joint surface of the lenses L1 and L2 constitutes a third surface, and a surface of the lens L2 on the side of the light source constitutes a fourth surface. Further, a surface of the prism P on the side of the collimator lens constitutes a fifth surface, and a surface on the opposite side, that is, on the side of the light source D constitutes a sixth surface. Shown in Table 3 below are radii of curvature, thicknesses at different positions and material of the respective surfaces. The collimator lens had a total focal length f=15 mm, and an NA of 0.15. Chromatic aberration correction rate (a) of the collimator

TABLE 2

|   | Curvature | Thickness | Material | Conic | Secondary | Quaternary | Sextic |
|---|---|---|---|---|---|---|---|
| 1 | 4.63E−02 | 4.00E−03 | A.F.(*1) | −7.68E+01 | 0.00E+00 | −2.19E−03 | −2.07E−04 |
| 2 | 4.63E−02 | 3.50E+00 | S-LAH65 | | | | |
| 3 | −3.06E−01 | 1.50E+00 | S-TIH6 | | | | |
| 4 | −1.59E−01 | 4.00E−03 | A.F.(*1) | −5.95E+00 | 0.00E+00 | −4.37E−03 | 8.91E−05 |
| 5 | −1.59E−01 | 1.00E+00 | | | | | |
| 6 | 0.00E+00 | 2.50E−01 | S-BSL7 | | | | |
| 7 | 0.00E+00 | 4.70E+00 | | | | | |

(*1): Aspheric Film

Figure 4:
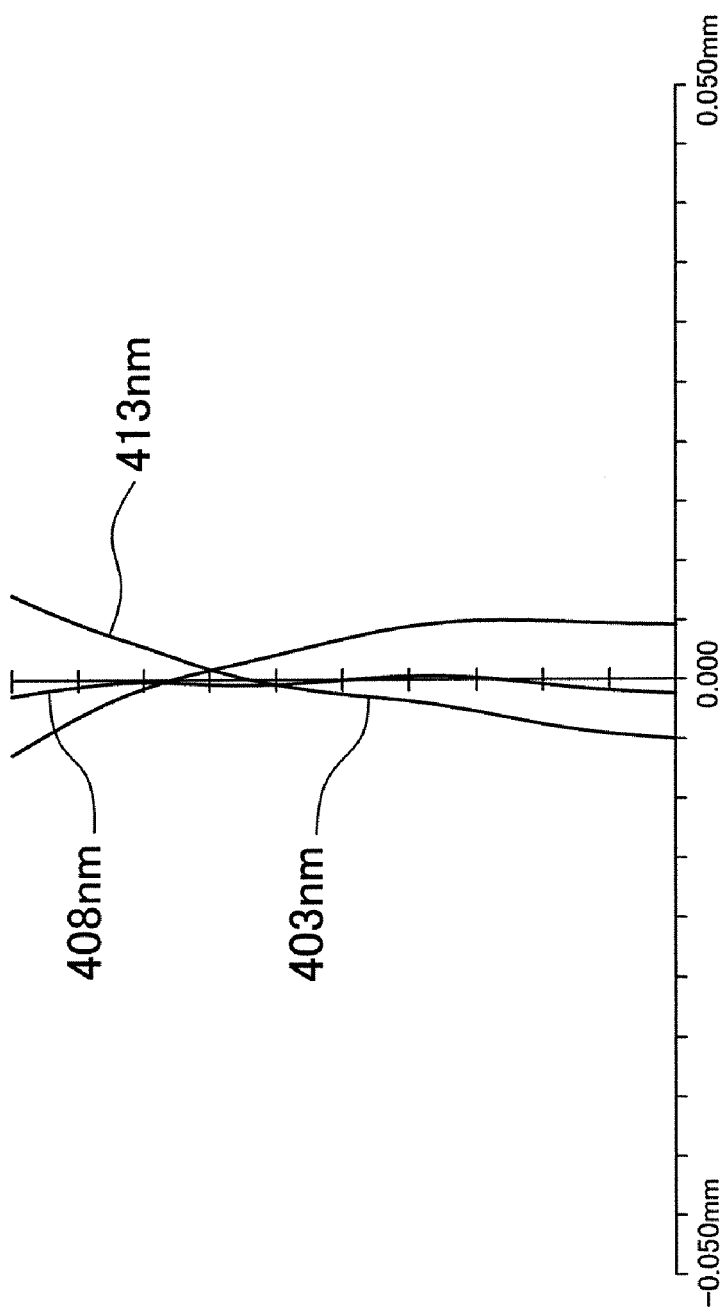
FIG. 4 is a graph of vertical aberrations of the optical system shown in FIG. 3.

Shown in FIG. 4 is a graph of vertical aberrations of an optical system employing the collimator lens of the above construction. This graph shows aberrations when the wavelength of a laser beam from the light source D was at 408 nm.

lens was 0.38 μm/nm. Figures for the prism P in Table 3 below were determined not only in consideration of the prism P which was actually located in a light path but also in consideration of the cover glass C.

TABLE 3

|   | Curvature | Thickness | Material | Conic | Secondary | Quaternary | Sextic |
|---|---|---|---|---|---|---|---|
| 1 | 9.78E−02 | 4.00E−03 | A.F.(*1) | 2.00E+00 | 0.00E+00 | −3.22E−04 | −5.95E−06 |
| 2 | 9.78E−02 | 2.30E+00 | S-BAL35 | | | | |
| 3 | −6.94E−02 | 1.50E+00 | S-TIH13 | | | | |
| 4 | −2.78E−02 | 1.00E+00 | | | | | |
| 5 | 0.00E+00 | 5.00E+00 | S-BSL7 | | | | |
| 6 | 0.00E+00 | 8.86E+00 | | | | | |

(*1): Aspheric Film

Figure 6:
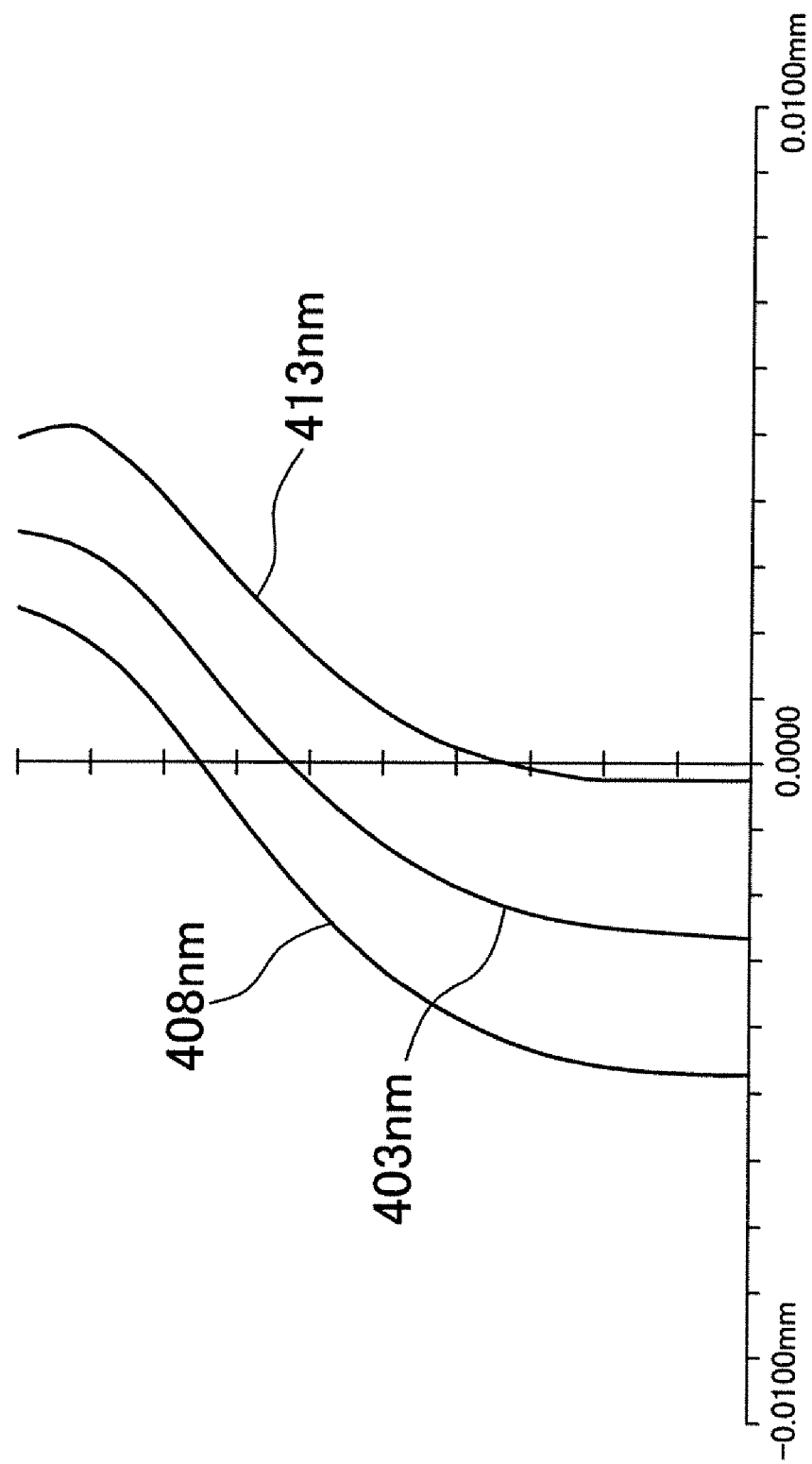
FIG. 6 is a graph of vertical aberrations of the embodiment of FIG. 5, when using a light source which emits a laser beam of 408 nm in wavelength.
Figure 7:
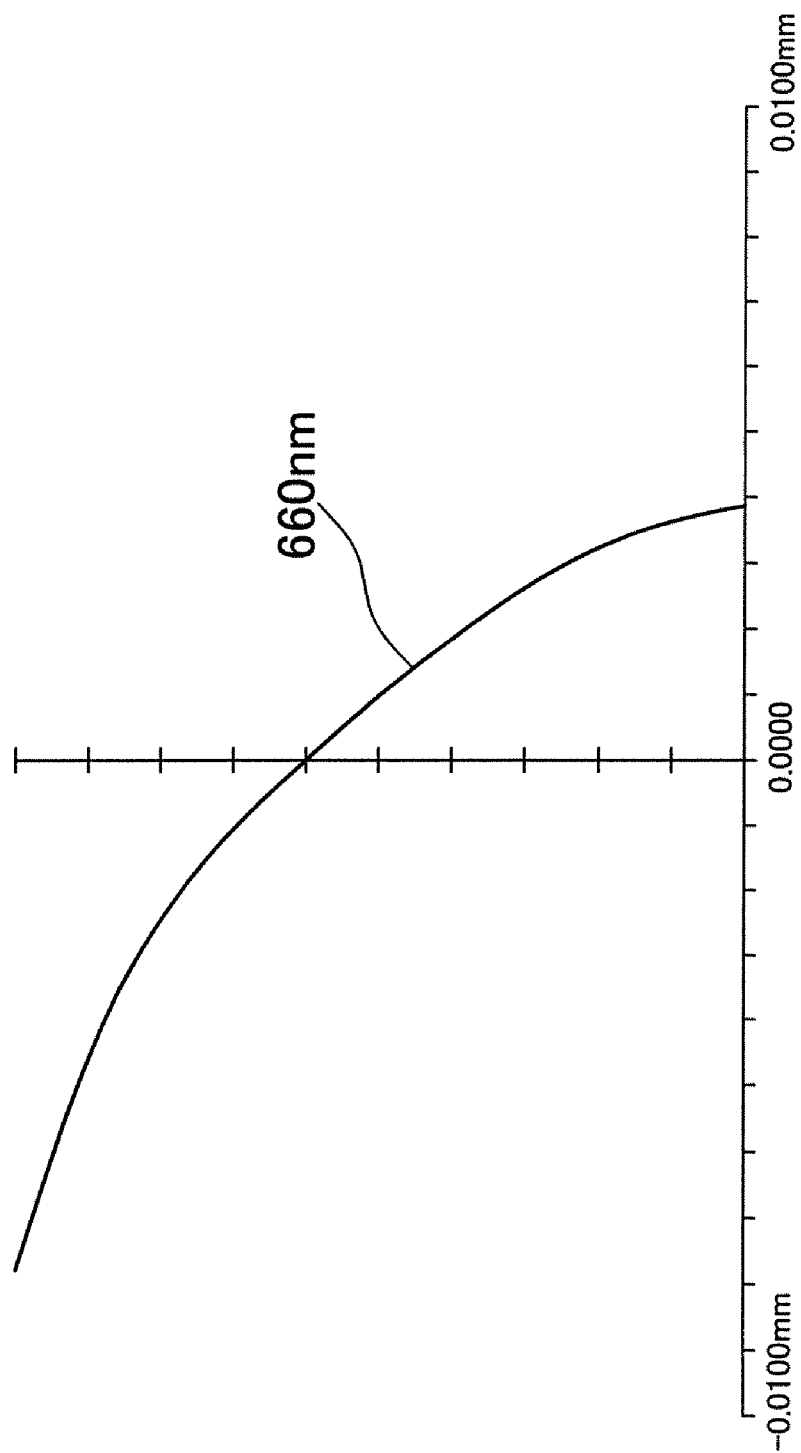
FIG. 7 is a graph of vertical aberrations of the embodiment of FIG. 5, when using a light source which emits a laser beam of 660 nm in wavelength.

Vertical aberrations in this case are shown in FIGS. 6 and 7. Namely, shown in FIG. 6 a graph of vertical aberrations when using a laser beam from a light source of 408 nm wavelength, along with aberrations which were observed when the laser beam wavelength from the light source D was fluctuated to 403 nm and 413 nm under the influence of temperature variations. Shown in FIG. 7 is a graph of vertical aberrations when using a laser beam of 660 nm from the other light source.

COMPARATIVE EXAMPLE

Figure 8:
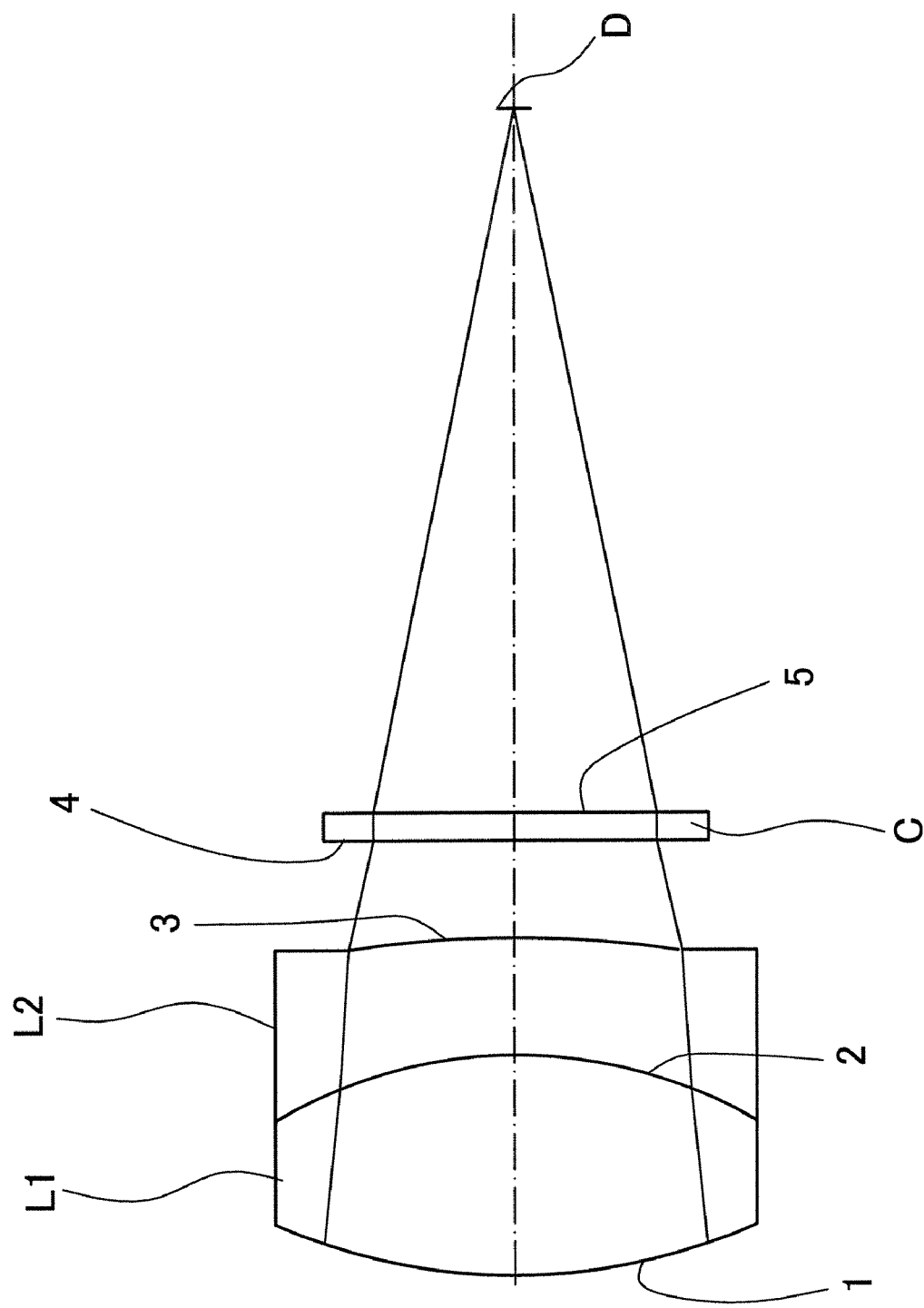
FIG. 8 is a schematic illustration of an optical system adopted as Comparative Example 1.

For comparison with the first embodiment, shown in FIG. 8 is an optical system having no aspheric plastic lens laminated on a cemented glass lens which is composed of a biconvex lens L1 and a meniscus lens L2. In this case, a surface of the biconvex lens L1 facing toward an information recording medium constitutes a first surface, a joint surface of the lenses L1 and L2 constitutes a second surface, a surface of the lens L2 on the side of the light source constitutes a third surface, a surface of the cover glass on the side of the collimator lens constitutes a fourth surface, and a surface on the opposite side of the cover glass, that is, on the side of the light source constitutes a fifth surface. Shown in Table 4 below are radii of curvature, thicknesses at different positions and material of the respective surfaces. The output wavelength of the laser diode of the light source D was 408 nm (in center wavelength and the same applies hereafter). The collimator lens had a total focal length f of 10 mm, and an NA of 0.2. Chromatic aberration correction rate (a) of the collimator lens was 0.64 μm/nm.

TABLE 4

|   | Curvature | Thickness | Material | Radius | Conic |
|---|---|---|---|---|---|
| 1 | 1.72E−01 | 2.20E+00 | S-BSL7 | 2.50E+00 | 0.00E+00 |
| 2 | 2.28E−01 | 1.20E+00 | S-TIM27 | 2.50E+00 | 0.00E+00 |
| 3 | −6.75E−02 | 1.00E+00 | | 1.75E+00 | 0.00E+00 |
| 4 | 0.00E+00 | 2.50E−01 | S-BSL7 | 2.00E+00 | 0.00E+00 |
| 5 | 0.00E+00 | 7.06E+00 | | 1.51E+00 | 0.00E+00 |

Figure 9:
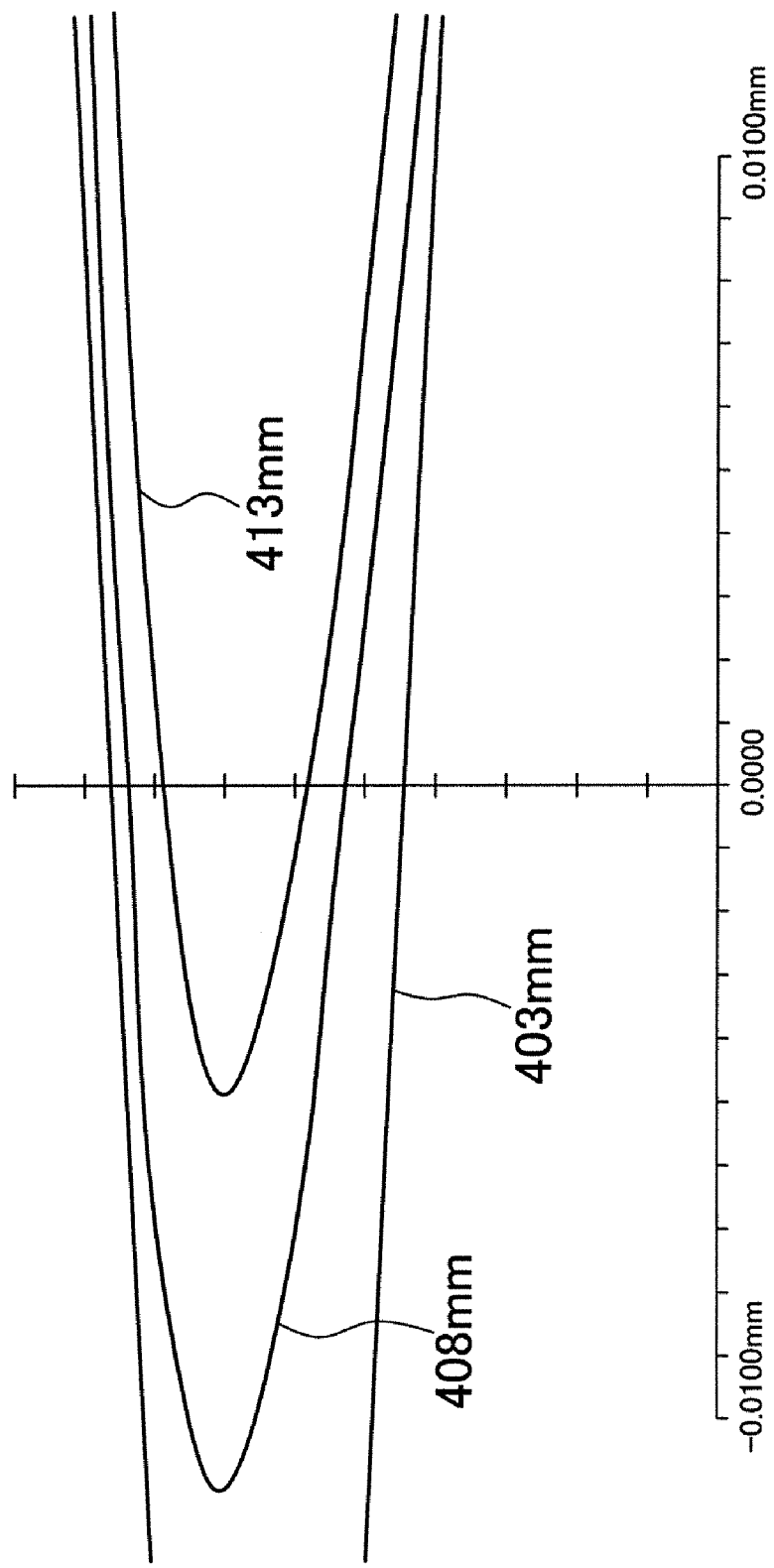
FIG. 9 is a graph of vertical aberrations of the optical system of FIG. 8.

Vertical aberrations in this Comparative Example are shown in FIG. 9. Namely, shown in FIG. 9 is a graph of vertical aberrations when the wavelength of a laser beam from a light source is 408 nm, 403 nm and 413 nm, respectively. Upon comparison of vertical aberration graphs of FIGS. 2 and 9, it will be clearly seen that the lens construction according to the present invention is capable of correcting aberrations effectively as compared with the lens construction of Comparative Example 1.

Comparative Example 1

Figure 10:
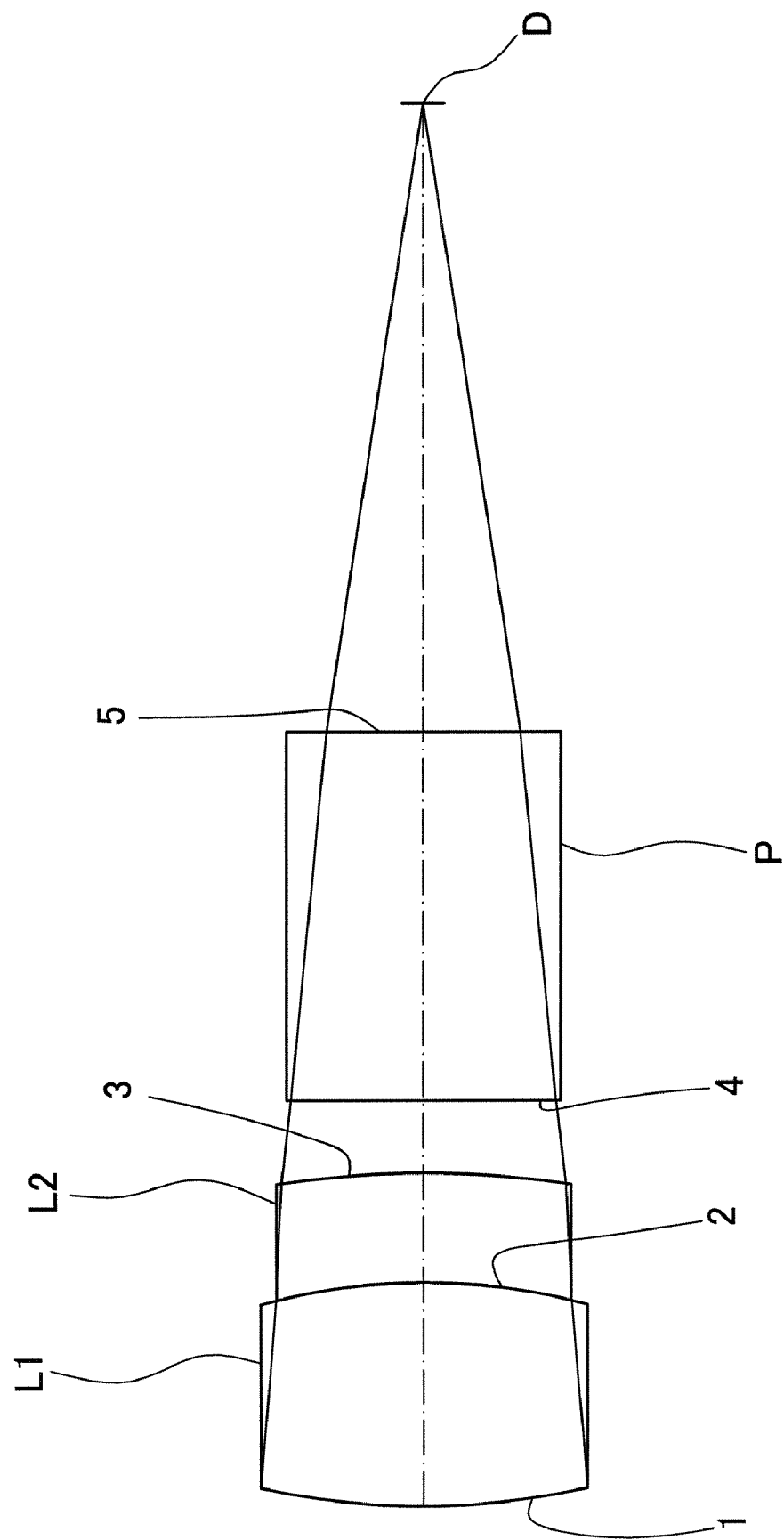
FIG. 10 is a schematic illustration of an optical system adopted as Comparative Example 2.

For comparison with the lens construction of FIG. 5, shown in FIG. 10 is an optical system employing a collimator lens in the form of a cemented glass lens which is composed of a biconvex lens L1 and a meniscus lens L2 but not laminated with an aspheric plastic lens on a surface of the lens L1.

In this case, a surface of the lens L1 facing toward an information recording medium constitutes a first surface, a joint surface of the lenses L1 and L2 constitutes a second surface, a surface of the lens L2 on the side of the light source D constitutes a third surface, a surface of the prism P on the side of the collimator lens constitutes a fourth surface, and a surface on the opposite side of the prism P, that is, on the side of the light source constitutes a fifth surface. Shown in Table 5 below are radii of curvature, thicknesses at different positions and material of the respective surfaces. The collimator lens had a total focal length f of 15 mm, and an NA of 0.15. Chromatic aberration correction rate (a) of the collimator lens was 0.52 μm/nm. As mentioned hereinbefore, figures for the prism P in Table 5 below were determined not only in consideration of the prism P which is actually located in a light path but also in consideration of the cover glass.

TABLE 5

|   | Curvature | Thickness | Material | Radius | Conic |
|---|---|---|---|---|---|
| 1 | 9.84E+00 | 3.00E+00 | S-BAL35 | 2.25E+00 | 0.00E+00 |
| 2 | −1.27E−01 | 1.50E+00 | S-LAH60 | 2.07E+00 | 0.00E+00 |
| 3 | −4.96E−02 | 1.00E+00 | | 2.03E+00 | 0.00E+00 |
| 4 | 0.00E+00 | 5.00E+00 | S-BSL7 | 1.88E+00 | 0.00E+00 |
| 5 | 0.00E+00 | 8.71E+00 | | 1.44E+00 | 0.00E+00 |

Figure 11:
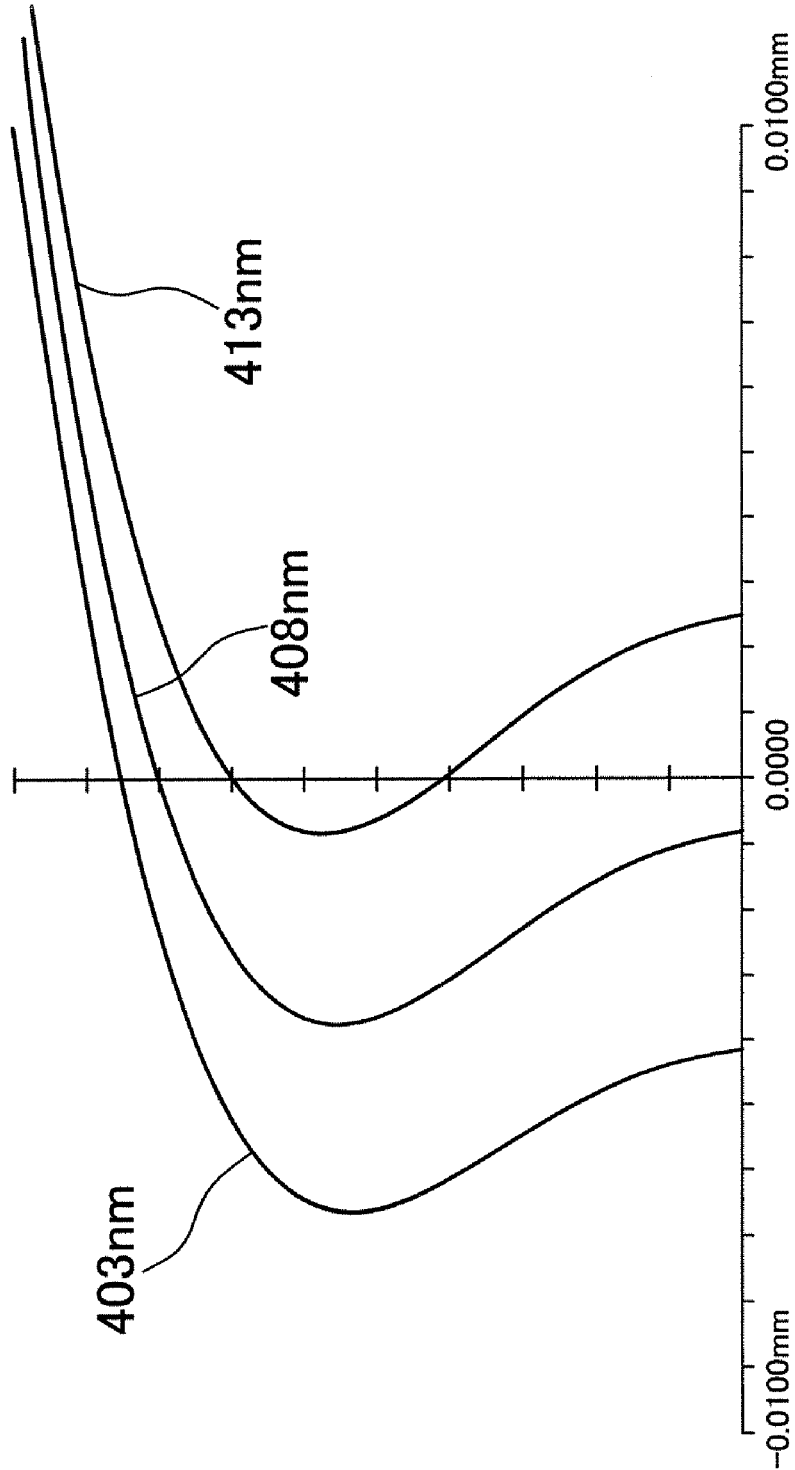
FIG. 11 is a graph of vertical aberrations of the optical system of FIG. 10, when using a light source which emits a laser beam of 408 nm in wavelength.

Shown in FIG. 11 are vertical aberrations of a collimator lens of this construction for a laser beam of 408 nm wavelength, along with vertical aberrations at wavelengths 403 and 413, respectively. Shown in FIG. 12 are vertical aberrations in the case of a light source which emits a laser beam of 600 nm wavelength.

Figure 12:
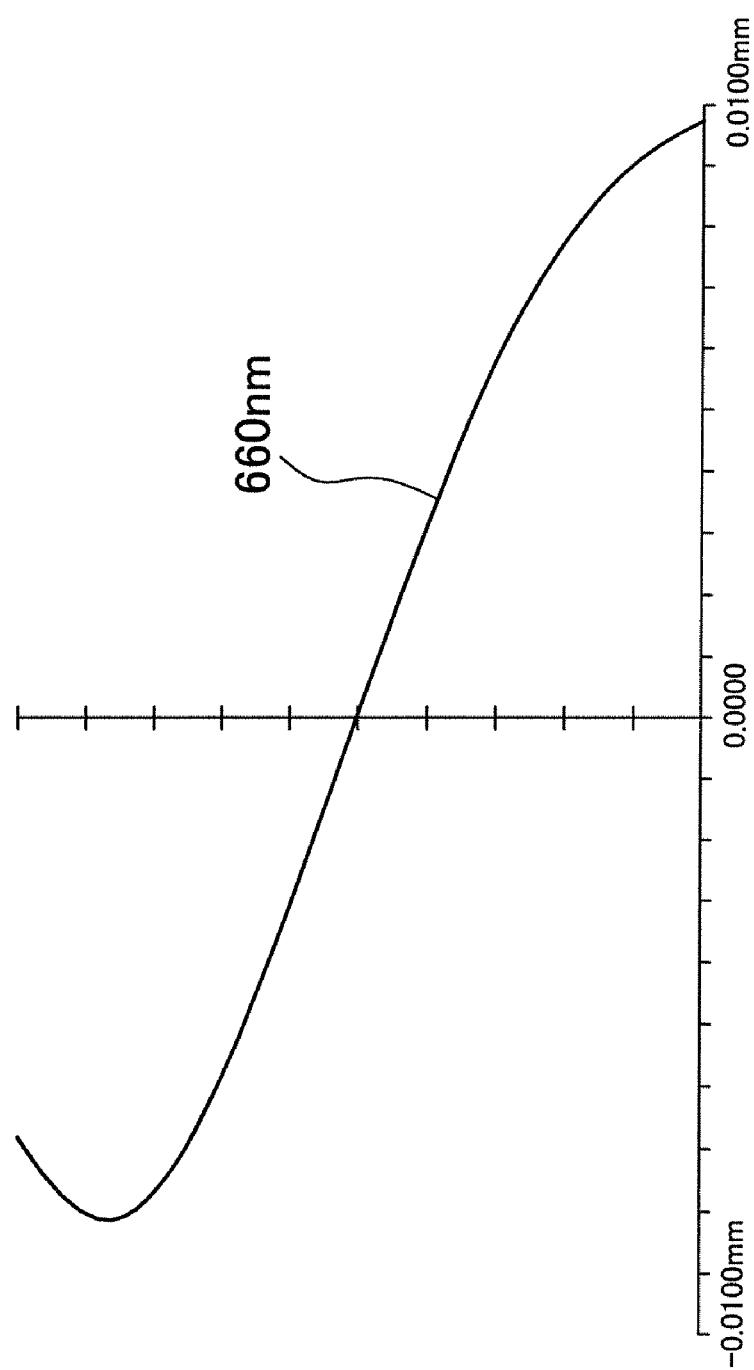
FIG. 12 is a graph of vertical aberrations of the optical system of FIG. 10, when using a light source which emits a laser beam of 660 nm in wavelength.

Upon comparing the vertical aberration diagrams of FIGS. 11 and 12 with those of FIGS. 6 and 7 according to the third embodiment of the invention, it will be seen that aberrations are improved drastically in the case of the embodiment of the invention.

In the foregoing tables, an aspheric film is of an aspheric plastic lens which is formed of a polyester-base synthetic resin material. Materials S-BSL7, S-TIM27, S-LAH60, 65, S-TIH6, 13, S-BAL35 are glass materials manufactured by OHARA. Further, the cemented glass lens of the collimator lens is made by bonding two lens elements by the use of a polyester-base adhesive.

What is claimed is:

1. A collimator lens for an optical pickup, said collimator lens being located in a light path from a laser light source to an optical information recording medium to collimate a laser beam from said lasor light source, and comprising:

a cemented glass lens formed by bonding together two glass lens elements comprising a biconvex lens and a meniscus lens; and an aspheric plastic lens in the form of a thin transparent synthetic resin film laminated on a surface of said biconvex lens located on the side of said optical information recording medium;

when calculated on the basis of a composite focal length f=10 mm, said collimator lens having an axial aberration correction rate (a) and a numerical aperture NA as expressed by following formulas (1) and (2), (a) 2.2~m/nm, (1)

0.4>NA≧0.12. (2)

2. A collimator lens for an optical pickup as defined in claim 1, wherein said aspheric plastic lens is formed of a polyester-base synthetic resin material.

3. A collimator lens for an optical pickup as defined in claim 1, wherein said biconvex lens and meniscus lens are bonded together by the use of a transparent adhesive agent.

4. A collimator lens for an optical pickup as defined in claim 1, wherein said aspheric plastic lens is laminated on a surface of said cemented glass lens by the use of a molding means.

5. A collimator lens for an optical pickup as defined in claim 1, wherein said meniscus lens is located on the side of said laser light source, and said aspheric plastic lens is located on said biconvex lens on a side away from said lasor light source.

6. A collimator lens for an optical pickup as defined in claim 1, wherein said aspheric plastic lens is laminated on a lens surface of said biconvex lens and on a lens surface of said meniscus lens as well.

7. A collimator lens for an optical pickup as defined in claim 1, wherein said laser light source is adapted to emits a laser beam of a wavelength in the range of from 395 nm to 415 nm.

8. A collimator lens for an optical pickup as defined in claim 1, wherein said optical pickup includes a first laser light source adapted to emit a laser beam of 408 nm wavelength and a second laser light source adapted to emit a laser beam of 660 nm wavelength, and a prism located such a position as to direct said laser beams of different wavelengths toward a light path, further said collimator lens being placed between said prism and said optical information recording medium of said light path.

9. A collimator lens for an optical pickup as defined in claim 1, wherein said laser light source is a laser diode.

10. An optical pickup incorporating a collimator lens of claim 1 into an optical pickup system for recording and reproducing information.

* * * * *